United States Patent [19]
Yokota et al.

[11] 3,785,787
[45] Jan. 15, 1974

[54] STAINLESS STEEL WITH HIGH RESISTANCE AGAINST CORROSION AND WELDING CRACKS

[75] Inventors: Kozo Yokota; Yukishige Fukase; Koichiro Osozawa, all of Yokohama, Japan

[73] Assignee: Nippon Yakin Kogyo Company Limited, Tokyo, Japan

[22] Filed: Oct. 6, 1972

[21] Appl. No.: 295,733

Related U.S. Application Data

[63] Continuation of Ser. No. 22,173, March 24, 1970, abandoned.

[52] U.S. Cl. .............. 29/196.1, 75/125, 219/137
[51] Int. Cl. ................. B32b 15/00, C22c 39/20
[58] Field of Search .............. 29/196.1; 219/37; 75/125

[56] References Cited
UNITED STATES PATENTS

| | | | |
|---|---|---|---|
| 2,914,346 | 11/1959 | Ryder | 29/196.1 |
| 2,963,129 | 12/1960 | Eberle | 29/196.1 |
| 3,019,513 | 2/1962 | Hornaday | 29/196.1 |
| 3,357,868 | 12/1967 | Tanczyn | 75/125 |
| 3,438,769 | 4/1967 | Kawahata | 75/125 |
| 3,610,876 | 10/1971 | Bhat | 219/137 |
| 2,712,317 | 1/1973 | Hayashi | 29/196.1 |

*Primary Examiner*—Hyland Bizot
*Attorney*—John E. Miller

[57] ABSTRACT

Stainless steel with high resistance against corrosion and welding cracks, consisting of carbon, silicon, manganese, nickel, chromium, copper and the remainder of iron with an inevitable amount of impurity. The contents of the aforesaid ingredient elements of the stainless steel are so related with each other that the value of the following austenite/ferrite ratio is kept equal to or less than 1.06.

$$\text{austenite/ferrite ratio} = \frac{Ni(\%) + 0.5Mn(\%) + 30C(\%) + 2}{Cr(\%) + 1.5Si(\%) - 5.6}$$

The stainless steel may contain a limited amount of molybdenum, niobium, titanium, and tantalum, with a modified austenite/ferrite ratio. The stainless steel is advantageously used to make heat exchangers in processes employing automatic tungsten inert gas arc welding techniques.

14 Claims, No Drawings

STAINLESS STEEL WITH HIGH RESISTANCE AGAINST CORROSION AND WELDING CRACKS

This is a continuation of application Ser. No. 22,173, filed Mar. 24, 1970 now abandoned.

This invention relates to stainless steel with high resistance against stress corrosion cracks and welding cracks, and more particularly to stainless steel having high stress corrosion resistance throughout the entire surface thereof and being free from stress corrosion cracks and welding bead cracks.

In chemical industries, stainless steel sheets are often used under severely corrosive conditions, for instance, steel sheets forming a reaction chamber or a heat exchanger are kept in contact with pressurized corrosive fluid on one side surface thereof while exposing the opposite surface thereof to a fluid including halogen ions, such as chloride ions. Under such conditions, the stainless steel sheets are exposed to the risk of corrosion throughout the entire surface thereof (to be referred to as "general corrosion," hereinafter), as well as the risk of stress corrosion cracking, which may lead to failure of the equipment.

As the size of equipment becomes large in chemical industries, the use of automatic welding has been expanding in making such equipment. Due to the need of quick delivery and efficient manufacture, automatic welding has increasingly been used. With the automatic welding, it is difficult to change welding conditions according to the weldability of the steel being used, as compared with manual welding. In addition, during automatic welding, curing of the material is prone to negligence. As a result, stainless steel equipment in chemical industries are exposed to shortcomings of automatic welding process, such as welding bead cracks and stress corrosion cracks caused by residual stress of welding.

Thus, stainless steel material for chemical industry equipment is required to have three kinds of properties, i.e., properties to resist against general corrosion, stress corrosion cracks, and welding bead cracks. There has not been any stainless steel hitherto which is provided with all of the aforesaid three kinds of properties, although conventional stainless steel materials alternatively have either one of the three kinds of properties.

The inventors have made a series of studies on stainless steel for equipments and machines in chemical industries, such as welded stainless steel pipes for heat exchangers, and succeeded in developing improved stainless steel having the aforesaid properties. The inventors confirmed by experiments that outstanding resistance against total surface corrosion, stress corrosion cracks, and welding bead cracks can be achieved by using stainless steel, which consists of, in percent by weight, 0.01 – 0.1 percent of carbon (C), 2 – 6 percent of silicon (Si), 0.01 – 3 percent of manganese (Mn), 0.5 – 5 percent of copper (Cu), 7 – 20 percent of nickel (Ni), 13 – 25 percent of chromium (Cr), and the remainder of iron with impurities, under conditions of $$\frac{Ni(\%) + 0.5Mn(\%) + 30C(\%) + 2}{Cr(\%) + 1.5Si(\%) - 5.6} \leq 1.06.$$

The inventors also confirmed that the corrosion resistance, especially resistance against stress corrosion, can further be improved by adding into the aforesaid composition 0.03 – 2.00 percent by weight of one or more elements selected from the group consisting of niobium, tantalum, and titanium.

It has generally been believed that elements which tend to increase the risk of welding cracks of stainless steel (to be referred to as "weldability-reducing elements," hereinafter) are silicon, copper, phosphorus, and niobium. In order to reduce the risk of welding cracks, it has been a practice to minimize the contents of the weldability-reducing elements. If it is required to add in stainless steel a considerable amount of some of the weldability-reducing elements for certain reasons, e.g., for taking advantage of special properties of the elements, the users of such stainless steel have to sacrifice the resistance against welding cracks to some extent.

Apart from the effects on the weldability, the aforesaid weldability-reducing elements have the following specific properties.

A small amount of silicon is used in a steel mill as a deoxidizer. Silicon is also known as a ferrite-forming element. The addition of a comparatively large amount of silicon improves the resistance of stainless steel against stress corrosion cracks in acidic chloride media such as magnesium chloride solution.

The addition of 0.5 – 5 percent of copper in stainless steel improves its corrosion resistance, especially the general corrosion resistance in a non-oxidizing solution and stress corrosion cracking resistance in mildly corrosive chloride solution.

Niobium acts to fix nitrogen in the structure of stainless steel, so as to improve the resistance against stress corrosion cracks. Niobium also combines with carbon and thus reduces the grain boundary corrosion.

As described above, the aforesaid elements have hitherto been considered detrimental to the weldability of stainless steel, but it has not been found that these elements can exist together in stainless steel to improve corrosion resistance thereof, without impairing weldability thereof.

The inventors have confirmed that silicon and copper can be used for improving the corrosion resistance of stainless steel, while avoiding their adverse effects of deteriorating the resistance of stainless steel against welding cracks. In order to avoid the increase of welding cracks, the amount of ferrite phase being formed during the welding process is controlled so as to be more than 1.2 percent, so that welding cracks, especially high temperature bead cracks, can be prevented even under severe welding conditions. In other words, according to the present invention, some of the elements, which have been considered to accelerate welding cracks are used for suppressing the welding cracks, based on the following findings of the inventors.

If a stable austenic stainless steel containing a large amount of both silicon and copper in its stable austenite single phase is welded, both of these elements tend to be concentrated in austenite grain boundary during the solidifying after the welding. As can be seen from the equilibrium diagram of a ternary Fe-Cr-Ni system, the range of composition of austenite phase produced by cooling molten steel is very wide under certain conditions; namely when austenite is in the form of austenic single phase composition prepared at a high temperature, when austenite initially contains a small amount of ferrite and the ferrite is diminished by peritectic reaction, or when the austenite phase is formed in a similar process. Due to the wide range of austenite composition, when austenite is formed by cooling molten stainless steel, the composition of the initially crystallized austenite phase greatly differs from that of the finally solidified portion thereof. Accordingly, as can be expected from the ternary Fe-Cr-Ni equilibrium diagram, the finally solidified portion of the austenite phase tends to contain a comparatively large amount of nickel crystallized therein. Silicon and copper, which are easily soluble in nickel, remain in the molten steel together with nickel until they are segregated in the finally solidified portion of the austenite phase, i.e., austenite grain boundary. In other words, if a large amount of silicon and copper exist in a stainless steel composition, together with nickel which readily dissolves silicon and copper, the silicon and copper tend to be segregated upon welding, and the segregated elements cause welding bead cracks when the stainless steel is subjected to stress during welding.

Thus, in order to prevent the welding bead cracks, it has been considered to be desirable to minimize contents of silicon, copper and the like in stainless steel, so as to restrain the metals readily soluble in nickel, such as silicon and copper, from segregating along the grain boundaries.

The inventors, however, noticed the fact that silicon and copper can be added in stainless steel composition without causing any increase in welding bead cracks, if the concentration of the silicon and copper in austenite grain boundaries of stainless steel can be kept at a low level. The inventors have succeeded in greatly reducing the concentration of silicon and copper by taking advantage of the phase diagram of the Fe-Cr-Ni ternary systems.

According to a process using the peritectic reactions of the Fe-Cr-Ni ternary system, the primary crystal from a molten steel of the ternary system includes a comparatively large amount of proeutectic ferrite containing a comparatively small amount of nickel, and then peritectic reactions occur between the proeutectic ferrite and the liquid phase steel for producing a new austenite phase, whereby the grain size of crystallized grains becomes smaller. The range of the austenite phase composition is considerably small, as compared with that of the austenite single phase without any crystallization of ferrite phase. Thus, concentration of nickel along the grain boundary is not remarkable. As a result, the concentration of silicon and copper in the stainless steel becomes smaller.

For a better understanding of the invention, reference is made to the accompanying drawings, in which:

FIGS. 1A and 1B are graphs showing distributions of copper and silicon in a stainless steel structure with a comparatively small amount of ferrite and a stainless steel structure with a comparatively large amount of ferrite, respectively; and FIG. 2 is a graph showing the relation between the amount of ferrite in welded structures of stainless steel and the austenite/ferrite ratio thereof.

The inventors carried out tungsten inert gas (TIG) welding by using argon gas on 18Cr/12Ni stainless steel containing 3.04 percent of silicon and 1.47 percent of copper, as well as on 18Cu/12Ni stainless steel containing 3.46 percent of silicon and 1.42 percent of copper. The degree of segregation of silicon and copper in welded beads was measured by using a microprobe analyser. Measurement was also made on the content of ferrite in the welded beads, so as to find the relation between the production of ferrite and the degree of segregation of silicon and copper. The results are shown in FIGS. 1A and 1B.

FIG. 1A shows the degree of segregation of silicon and copper in beads made by the test welding of 18Cu/12Ni stainless steel sample containing 3.04 percent of silicon and 1.47 percent of copper. With this sample of stainless steel, the amount of residual ferrite phase was always less than 1.2 percent, and austenite grain boundaries with high concentrations of copper and silicon were formed in the welded beads, as shown in FIG. 1A. During the welding of this sample, bead cracks were formed at the austenite grain boundaries.

Curves of FIG. 1B represent the results of welding tests on the 18Cr/12Ni stainless steel sample containing 3.46 percent of silicon and 1.42 percent of copper, illustrating the degree of segregation of silicon and copper at welded beads of the sample steel. The amount of the ferrite phase in various parts of the beads proved to be 4 – 6 percent. In this steel sample, there was no localized concentration of silicon and copper in the welded beads, as shown in FIG. 1B. There was no bead cracks caused by the welding of this steel sample.

It is apparent from the foregoing that segregation of silicon and copper, which is detrimental to successful welding, can be prevented by providing a small amount of ferrite phase in an austenite matrix of stainless steel structure at welding portions. The formation of the ferrite phase in the stainless steel structure being welded, however, mainly depends on the composition of the stainless steel being welded.

Welding tests were made to find the relation of the amount of ferrite phase in the austenite matrix and the bead cracks caused by welding, by conducting TIG automatic welding in an argon atmosphere on test pieces consisting of Cr-Ni stainless steel containing at least 2–6 percent of silicon. The results are shown in FIG. 2.

Referring to FIG. 2, the abscissa represents the value of the following formula (1), in which the contents of ingredient elements are in percent by weight, based on the weight of the stainless steel.

$$\frac{Ni(\%)+0.5Mn(\%)+30C(\%)+2}{Cr(\%)+1.5Si(\%)-5.6} \qquad (1)$$

The formula 1 is derived by considering the fact that nickel, manganese, and carbon act as austenite-stabilizing elements in the stainless steel, while chromium and silicon act as ferrite-stabilizing elements. The ordinate of FIG. 2 represents the content of ferrite phase in the welded stainless steel structure. Cross marks ($x$) in FIG. 2 represent those samples which produced welding bead cracks, while the circle marks ($o$) represent those samples which were free from welding bead cracks.

If a noticeable amount of molybdenum is contained in the stainless steel, the following formula (1') is used as the values to be represented on the abscissa of FIG. 2.

$$\frac{Ni(\%)+0.5Mn(\%)+30C(\%)+2}{Cr(\%)+1.5Si(\%)+Mo(\%)-5.6} \qquad (1')$$

If the sample stainless steel contains titanium, niobium, and tantalum, the following formula (2) is used, instead of the formula 1, for determining the values to be represented on the abscissa of FIG. 2.

$$\frac{Ni(\%)+0.5Mn(\%)+300(\%)+2}{Cr(\%)+1.5Si(\%)+Mo(\%)+0.5Nb(\%)+0.5Ti(\%)+0.5Ta(\%)-5.6} \qquad (2)$$

In the following description, the values of the formulae 1, 1', and 2 will be referred to as the austenite/ferrite ratio, because the numerical values of the formulae are indicative of the possible amount of ferrite to be produced in the stainless steel structure upon welding.

It is apparent from FIG. 2 that as the austenite/ferrite ratio diminishes, i.e., as the content of the ferrite-stabilizing elements increases, the content of the ferrite phase in the welded stainless steel structure increases, and the risk of welding bead cracks decreases. On the contrary, as the austenite/ferrite ratio increases, or as the content of the austenite-stabilizing elements increases, the welded structure becomes closer to austenite single phase structure, so that the risk of welding bead cracks increases, when a large amount of silicon, copper, or niobium is present.

Accordingly, in order to prevent the welding bead cracks, the austenite/ferrite ratio should be restricted to be smaller than a certain value. According to the results of experiments carried out by the inventors, there was no welding bead cracks when the austenite/ferrite ratio was 1.06 or smaller, as shown in FIG. 2. Welding bead cracks were experienced when the austenite/ferrite ratio was larger than 1.06.

Thus, welding bead cracks can be prevented by controlling the composition of stainless steel, while using the aforesaid austenite/ferrite ratio as a scale, for instance by limiting the austenite/ferrite ratio at a value not greater than 1.06.

According to the present invention, the composition of stainless steel is defined by further considering the corrosion resistance, shapability, and other properties thereof, as will be described hereinafter. In other words, according to the present invention, in order to prevent the welding bead cracks of stainless steel while ensuring high corrosion resistance thereof, the content of each of ingredient elements of the stainless steel should fall within the following range, provided that the aforesaid austenite/ferrite ratio is kept at 1.06 or smaller than 1.06.

Carbon, 0.01–0.1 percent: Stainless steel of the invention becomes very susceptible to stress corrosion cracking if the carbon content is less than 0.01 percent, while more than 0.1 percent of carbon can cause intergranular corrosion during pickling of stainless steel.

Silicon, 2–6 percent: The addition of silicon in stainless steel is necessary for formation of ferrite phase therein, which ferrite phase is effective in preventing welding bead cracks, and for improving the resistance against stress corrosion cracks. Less than 2 percent of silicon is not effective for improvement of stress corrosion resistance and formation of the desired amount of ferrite, while the addition of silicon in excess of 6 percent gives adverse effects on malleability.

Manganese, 0.01–3 percent: It is a general practice in steel industry to add manganese in steel at a rate less than 3 percent. Manganese contained in starting materials for steel making is carried into steel products, and in eliminating such manganese, it is difficult to reduce its content to less than 0.01 percent, while further elimination of manganese does not provide any substantial gain in the properties of stainless steel.

Copper, 0.5–5 percent: Copper is effective in improving the resistance against the general corrosion. It is also effective in preventing pitting and stress corrosion cracking in mildly corrosive chloride solution, such as sodium chloride solution. Less than 0.5 percent of copper does not result in any noticeable improvement of the corrosion resistance, while the addition of copper in excess of 5 percent tends to give adverse effects on the malleability and weldability of stainless steel by precipitating deposits mainly consisting of copper.

For improving the resistance against the general and pitting corrosion, molybdenum is also effective, but molybdenum has drawback in that it increases stress corrosion cracks. Accordingly, it is preferable to use copper for improving the resistance against the general and pitting corrosion while minimizing the molybdenum content therein.

The addition of copper in excess of 0.5 percent also improves the shapability of stainless steel in cold working.

Chromium, 13–25 percent; nickel, 7–20 percent: Chromium and nickel are essential ingredients of stainless steel for ensuring the corrosion resistance and mechanical strength thereof. Chromium content less than 13 percent results in considerable deterioration of the resistance against general and pitting corrosion, while the addition of chromium in excess of 25 percent tends to produce detrimental sigma phase in the stainless steel. the minimum content of nickel to ensure satisfactory resistance against stress corrosion cracks is 7 percent, while the addition of nickel in excess of 20 percent sharply increases the cost of stainless steel without producing any material improvement of the corrosion resistance.

Other elements:

Preferably, it is useful to add 0.03 – 2 percent of one or more elements from the group of niobium, tantalum, and titanium. The addition of such elements can eliminate intergranular corrosion and also increases stress corrosion cracking resistance by combining with nitrogen, which is detrimental to stress corrosion cracking if it is dissolved in solid solution. Accordingly, their addition is preferable. The effects of niobium, tantalum, and titanium are substantially equivalent to each other, and hence, any one or two or three can be used. Less than 0.03 percent of such element or elements is not effective in improving the resistance against the intergranular corrosion. Stainless steel usually contains less than 0.03 percent of such element or elements as impurities left from the starting materials. The addition of more than 2 percent of one or more of niobium, tantalum, and titanium produces a noticeable amount of compounds with other elements, which are detrimental to the manufacture of satisfactory stainless steel.

Phosphorus should be limited to less than 0.04 percent, because it tends to accelerate the stress corrosion cracks of stainless steel. Similarly, the content of molybdenum is preferably limited to less than 0.1 percent, due to its inclination to accelerate the stress corrosion, although molybdenum improves the resistance against general corrosion. If a certain degree of stress corrosion cracks should be allowed, up to 0.5 percent of molybdenum can be contained in the stainless steel, e.g., as a part of impurities carried from melting materials.

A very small amount of sulfur may be contained in stainless steel, as a part of impurities thereof. Since such small amount of sulfur does not affect the corrosion resistivity, sulfur content up to a level normally achievable by conventional steel making process is allowable.

The stainless steel according to the present invention will now be described in further detail, referring to examples.

Example 1

Stress corrosion cracks of the stainless steel of the present invention were compared with those of known stainless steel, by using samples, as listed in Table 1. For the purpose of simplicity of the comparison, some of Samples of known stainless steel were so selected that contents of individual ingredients lie within those according to the present invention but their austenite/ferrite ratios exceed 1.06, such as Samples H, I, and M. Some other samples of known stainless steel have compositions outside of the composition range of the present invention, together with austenite/ferrite ratios smaller than 1.06, such as Sample F. The remaining Samples of known stainless steel have compositions and austenite/ferrite ratios, both different from those of the present invention, such as Samples G, J, K, L, N, O, P, Q, R, and S.

It is apparent from Table 2 that the stainless steel according to the present invention (Samples A to E) did not produce any stress corrosion cracks even after 300 hours of loading under the constant load conditions. Similarly, stainless steel of Samples F – M, which contained 2 percent or more of silicon, did not produce any stress corrosion cracks in 300 hours of the aforesaid constant load test. On the other hand, those samples, whose silicon content was less than 2 percent, experienced stress corrosion cracks in less than 150 hours of the aforesaid constant load test.

In the constant strain test in sodium chloride solution, stainless steel Samples containing both 2 percent or more of silicon and 0.5 percent or more of copper did not experience any stress corrosion cracks at all, while Samples containing less than 2 percent of silicon (e.g., Samples N and O) or the Sample which contains only 0.01 percent copper (Sample F) experienced some stress corrosion cracks.

Example 2

Samples of Table 1 were prepared in the same manner as Example 1, and general and pitting corrosion tests were made on them. The results are shown in Table 2.

The corrosion tests were carried out in three different processes: namely, measuring the corrosion ($gr/m^2$-hr) of each sample by dipping it in a boiling solution

TABLE 1

| Kind of steel | Sample Symbol | Composition | | | | | | | A/F ratio* |
|---|---|---|---|---|---|---|---|---|---|
| | | C(%) | Si(%) | Mn(%) | Ni(%) | Cr(%) | Mo(%) | Cu(%) | |
| Stainless steel of the invention | A | 0.04 | 3.51 | 0.61 | 12.65 | 18.60 | — | 1.44 | 0.89 |
| | B | 0.05 | 3.57 | 0.68 | 12.65 | 18.88 | 0.003 | 1.47 | 0.88 |
| | C | 0.04 | 3.02 | 0.55 | 13.90 | 19.87 | — | 1.44 | 0.93 |
| | D | 0.05 | 3.19 | 0.62 | 12.60 | 18.68 | 0.03 | 1.55 | 0.92 |
| | E | 0.05 | 3.42 | 0.51 | 13.06 | 18.35 | — | 0.70 | 0.94 |
| Known stainless steel | F | 0.05 | 3.47 | 0.50 | 13.06 | 18.35 | — | 0.01 | 0.93 |
| | G | 0.06 | 1.89 | 1.40 | 18.06 | 17.77 | — | 0.01 | 1.50 |
| | H | 0.04 | 2.50 | 0.56 | 13.02 | 17.25 | — | 1.50 | 1.07 |
| | I | 0.06 | 3.07 | 1.56 | 12.31 | 16.93 | — | 1.46 | 1.09 |
| | J | 0.06 | 2.58 | 1.49 | 20.54 | 14.02 | — | 3.24 | 2.06 |
| | K | 0.07 | 2.80 | 1.62 | 20.25 | 14.78 | — | 3.38 | 1.88 |
| | L | 0.06 | 3.39 | 1.49 | 20.19 | 13.87 | — | 4.08 | 1.85 |
| | M | 0.06 | 3.49 | 1.55 | 19.95 | 13.88 | — | 3.76 | 1.81 |
| | N | 0.06 | 0.71 | 1.70 | 9.03 | 18.46 | — | — | — |
| | O | 0.07 | 0.66 | 1.85 | 12.31 | 16.83 | 2.65 | — | — |
| | P | 0.06 | 0.58 | 1.71 | 12.83 | 17.67 | 2.31 | 2.08 | — |
| | Q | 0.13 | 0.85 | 1.59 | 21.02 | 25.02 | — | — | — |
| | R | 0.05 | 0.79 | 1.73 | 21.81 | 17.72 | 2.25 | 1.49 | — |
| | S | 0.04 | 0.58 | 1.55 | 22.11 | 24.42 | 2.05 | — | — |

* See equation (1').

The stress corrosion tests were conducted under constant strain and under constant load. In the case of constant load tests, samples of Table 1 were dipped in a solution of concentrated solution of magnesium chloride, which was kept at 150°C, and tension stress was applied to Samples in the solution. The tension varied in a range of 25 – 35 kg/mm². In the case of constant strain tests, Samples were dipped in a boiling salt water for 500 hours, which salt water contained 20 percent of sodium chloride and 1.5 percent of sodium bichromate. The results are shown in Table 2.

containing 5 percent sulfuric acid for 6 hours; measuring the corrosion of each sample by dipping it in a 10 percent hydrochloric acid solution at 30°C for 24 hours; and measuring the corrosion of each sample by dipping it in a 10 percent ferric chloride solution at 40°C for 4 hours.

As regards the resistance against 5 percent sulfuric acid, Samples A–E of the present invention and some copper-containing stainless steel samples, i.e., Samples K–M, experienced only slight general corrosion. On the other hand, those stainless steel Samples, which con-

TABLE 2

| Kind of steel | Sample Symbol | Stress corrosion cracks | | | Total surface corrosion test by dipping | | | Welding test | |
|---|---|---|---|---|---|---|---|---|---|
| | | Constant pressure, Breaking time in MgCl₂ (hours) | | Constant strain, cracks in samples in salt water | Corrosion in boiling 5% sulfuric acid | Corrosion in 10% hydrochloric acid at 30°C | Corrosion in 10% ferric chloride solution at 40°C | Cracks on welding face-beads | Cracks on welding back-beads |
| | | Stress 25 Kg/mm² | Stress 35 Kg/mm² | | (gr/m²hr) | (gr/m²hr) | (gr/m²hr) | | |
| Stainless steel of the invention | A | More than 300 | More than 300 | None | 24.0 | 0.90 | 3.49, 5.36 | None | None |
| | B | " | " | " | 24.0 | 0.87 | 2.48, 5.58 | " | " |
| | C | " | " | " | 18.0 | 1.03 | 4.07, 4.54 | " | " |
| | D | " | " | " | 16.9 | — | 5.03, 5.09 | " | " |
| | E | " | " | " | 17.5 | — | 2.01, 2.03 | " | " |
| Known stainless steel | F | More than 300 | More than 300 | Some | 100 | — | — | " | " |
| | G | " | " | — | 120 | 2.36 | 14.2 | A few | A few |
| | H | More than 300 | More than 300 | None | — | — | — | A few | A few |
| | I | " | " | " | — | — | — | " | " |
| | J | More than 300 | More than 300 | None | 797, 980 | — | — | Many | Many |
| | K | " | " | " | 5.35 | — | — | " | " |
| | L | " | " | " | 6.28, 6.90 | — | — | " | " |
| | M | " | " | " | 5.63, 6.04 | — | — | " | " |
| | N | 1, 1 | — | Some | 37.9, 39.5 | 3.06 | 26.8 | — | — |
| | O | 6, 6 | 5 | " | 37.4, 37.7 | 4.14, 6.63 | 14.7 | — | — |
| | P | 6, 7 | — | None | — | — | — | — | — |
| | Q | 119, 154 | 38, 40 | Some | — | — | — | — | — |
| | R | 36, 37 | 23, 25 | — | — | — | — | — | — |
| | S | 20, 24 | 15, 26 | — | — | — | — | — | — | tained only a very small amount of copper (Samples F, G) or no copper at all (Samples N, O), experienced a considerably large extent of general corrosion. The resistance of stainless steel against sulfuric acid varied depending on the content of copper therein.

The tests with the 10 percent hydrochloric acid at 30°C proved that the stainless steel samples of the present invention had a high resistance against hydrochloric acid, while Samples which contained a small amount of copper or no copper (Samples G, N, O) experienced considerable general corrosion.

According to the results of tests with 10 percent ferric chloride solutions at 40°C, which were intended to check the pitting corrosion resistance, samples of the present invention proved to have an improved resistance against such salt.

The critical current density for passivation was measured on Sample A, representative of the stainless steel of the present invention, and on Sample F, representative of conventional stainless steel, in a deaerated 5 percent sulfuric acid solution at 30°C by potentiostatic method. The critical current density for passivation of Sample A proved to be 88 μA/cm², while that of Sample F was 2,010 μA/cm². In other words, it was found that Sample A of the present invention can be passivated more easily than Sample F of known stainless steel whose copper content is less than 0.5 percent.

Example 3

Samples A–M, as shown in Table 1, were shaped into 3 mm thick sheets, and the sheets thus shaped were subjected to tungsten inert gas (TIG) welding. The welding was carried out by an automatic welder using tungsten electrodes and argon gas. The cracks on welding beads formed by the TIG welding were examined by color check. The results are shown in Table 2.

The welding conditions include a welding current of 180 A, a welding speed of 200 mm/min., and an argon ejection at 12 lit./min.

According to the results of the welding test, all samples with an austenite/ferrite ratio, which is smaller than 1.06 (Samples A–F), did not experience any welding cracks both at face-beads and back-beads.

Even when the austenite/ferrite ratio exceeds 1.06, if its difference from 1.06 is small (e.g., Samples G, H, I), the number of welding bead cracks is very small, although the welding bead cracks cannot be prevented completely. As the value of the austenite/ferrite ratio departs further from 1.06, the number of welding bead cracks increases.

The mechanical strength of the stainless steel of the invention was compared with that of a known stainless steel (Sample F) containing a small amount of copper. The results are shown in Table 3. It is apparent from the table that the stainless steel according to the present invention has excellent mechanical strength. It was found that Sample F, which contained only 0.01 percent of copper, had a hardness higher than that of the stainless steel of the present invention.

TABLE 3

| Item | Samples of the present invention | | | | | | | | Stainless steel of known composition |
|---|---|---|---|---|---|---|---|---|---|
| Sample symbol | Sample A | | Sample B | | Sample C | | Sample D | Sample E | Sample F |
| Shape | Round bar | Plate | Round bar | Plate | Round bar | Plate | Plate | Plate | Plate |
| Yield (0.2% offset) Kg/mm² | 24.1 | 28.6 | 28.5 | 29.5 | 23.5 | 27.6 | 29.2 | 28.8 | 28.0 |
| Tensile strength Kg/mm² | 61.9 | 66.6 | 64.8 | 67.5 | 57.7 | 61.6 | 65.8 | 65.9 | 67.1 |
| Elongation % | 69.6 | 61.6 | 69.2 | 58.8 | 69.0 | 59.8 | 59.0 | 58.6 | 62.0 |
| Contraction of area % | 73.6 | — | 75.7 | — | 75.0 | — | — | — | — |
| Hardness* | HB 152 | HV 165 | HB 147 | HV 164 | HB 139 | HV 157 | HV 161 | HV 174 | HV 186 |

*HB represents a Brinell hardness number, while HV represents a Vicker's hardness number.

What is claimed is:

1. A stainless steel heat exchanger for receiving corrosive chemicals, a portion of the body of said heat exchanger adapted to come into contact with said corrosive chemicals, said portion having a welded joint therein made by continuous inert gas arc welding with non-consumable tungsten electrodes, the stainless steel of said portion consisting essentially of 0.01 to 0.1 percent by weight carbon, 2 to 6 percent by weight silicon, 0.01 to 3 percent by weight manganese, 7 to 20 percent by weight nickel, 13 to 25 percent by weight chromium, 0.5 to 5 percent copper and the remainder iron, the contents of the elements in the stainless steel satisfy the relationship.

$$\frac{Ni(\%)+0.5Mn(\%)+30C(\%)+2}{Cr(\%)+1.5Si(\%)-5.6}=1.06$$

2. A heat exchanger according to claim 1 wherein the stainless steel of said portion consists essentially of 0.01 to 0.1 percent by weight carbon (C), 2 to 6 percent by weight silicon (Si), 0.01 to 3 percent by weight manganese (Mn), 7 to 20 percent by weight nickel (Ni), 13 to 25 percent by weight chromium (Cr), 0.5 to 5 percent by weight copper (Cu), up to 0.1 percent by weight molybdenum (Mo), and the remainder iron with an inevitable amount of impurity, the contents of the elements in the stainless steel satisfying the relationship $$\frac{Ni(\%)+0.5Mn(\%)+30C(\%)+2}{Cr(\%)+1.5Si(\%)+Mo(\%)-5.6}=1.06$$

3. A heat exchanger according to claim 1 wherein the stainless steel of said portion consists essentially of in percent by weight, 0.01 to 0.1 percent carbon (C), 2 to 6 percent silicon (Si), 0.01 to 3 percent manganese (Mn), 7 to 20 percent nickel (Ni), 13 to 25 percent chromium (Cr), 0.5 to 5 percent copper (Cu), 0.03 to 2.00 percent of at least one element selected from the group consisting of niobium (Nb), tantalum (Ta), and titanium (Ti), and the remainder of iron with an inevitable amount of impurity, the contents of the elements in the stainless steel satisfying the relationship $$\frac{Ni(\%)+0.5Mn(\%)+30C(\%)+2}{Cr(\%)1.5Si(\%)+0.5Nb(\%)+0.5Ti(\%)+0.5Ta(\%)-5.6}=1.06$$

4. A heat exchanger according to claim 1 wherein the stainless steel of said portion consists essentially of in percent by weight, 0.01 to 0.1 percent carbon (C), 2 to 6 percent silicon (Si), 0.01 to 3 percent manganese (Mn), 7 to 20 percent nickel (Ni), 13 to 25 percent chromium (Cr), 0.5 to 5 percent copper (Cu), up to 0.1 percent molybdenum (Mo), 0.03 to 2.00 percent of at least one element selected from the group consisting of niobium (Nb), tantalum (Ta), and titanium (Ti), and the remainder of iron with an inevitable amount of impurity, said contents of the elements in the stainless steel satisfying the relationship $$\frac{Ni(\%)+0.5Mn(\%)+30C(\%)+2}{Cr(\%)+1.5Si(\%)+Mo(\%)+0.5Nb(\%)+0.5Ti(\%)+0.5Ta(\%)-5.6}=1.06$$

5. An article manufacture having a welded joint therein joining two edges of material together, said welding joint produced by subjecting said two edges of continuous inert gas arc welding with nonconsumable tungsten electrodes, said edges composed of a stainless steel each independently consisting essentially of by weight, 0.01 to 0.1 percent carbon, 2 to 6 percent silicon, 0.01 to 3 percent manganese, 7 to 20 percent nickel, 13 to 25 percent chromium, 0.5 to 5 percent copper and the remainder iron, the contents of the elements in the stainless steel satisfying the relationship $$\frac{Ni(\%)+0.5Mn(\%)+30C(\%)+2}{Cr(\%)+1.5Si(\%)-5.6}=1.06$$

6. The article of manufacture of claim 5 wherein said stainless steel consists essentially of by weight 0.01 to 0.1 percent by weight carbon (C), 2 to 6 percent by weight silicon (Si), 0.01 to 3 percent by weight manganese (Mn), 7 to 20 percent by weight nickel (Ni), 13 to 25 percent by weight chromium (Cr), 0.5 to 5 percent by weight copper (Cu), up to 0.1 percent by weight molybdenum (Mo), and the remainder iron with an inevitable amount of impurity, the contents of the elements in the stainless steel satisfying the relationship $$\frac{Ni(\%)+0.5Mn(\%)+30C(\%)+2}{Cr(\%)+1.5Si(\%)+Mo(\%)-5.6}=1.06$$

7. The article of manufacture of claim 5 wherein said stainless steel consists essentially in percent by weight 0.01 to 0.1 percent carbon (C), 2 to 6 percent silicon (Si), 0.01 to 3 percent manganese (Mn), 7 to 20 percent nickel (Ni), 13 to 25 percent chromium (Cr), 0.5 to 5 percent copper (Cu), 0.03 to 2.00 percent of at least one element selected from the group consisting of niobium (Nb), tantalum (Ta), and titanium (Ti), and the remainder of iron with an inevitable amount of impurity, the contents of the elements in the stainless steel satisfying the relationship $$\frac{Ni(\%)+0.5Mn(\%)+30C(\%)+2}{Cr(\%)1.5Si(\%)+0.5Nb(\%)+0.5Ti(\%)+0.5Ta(\%)-5.6}=1.06$$

8. The article of manufacture of claim 5 wherein said stainless steel consists essentially in percent by weight 0.01 to 0.1 percent carbon (C), 2 to 6 percent of silicon (Si), 0.01 to 3 percent manganese (Mn), 7 to 20 percent nickel (Ni), 13 to 25 percent chromium (Cr), 0.5 to 5 percent copper (Cu), up to 0.1 percent molybdenum (Mo), 0.03 to 2.00 percent of at least one element selected from the group consisting of niobium (Nb), tantalum (Ta), and titanium (Ti), and the remainder of iron with an inevitable amount of impurity, said contents of the elements in the stainless steel satisfying the relationship $$\frac{Ni(\%)+0.5Mn(\%)+30C(\%)+2}{Cr(\%)+1.5Si(\%)+Mo(\%)+0.5Nb(\%)+0.5Ti(\%)+0.5Ta(\%)-5.6}=1.06$$

9. A process for forming a welded article having high resistance against (a) general corrosion, (b) stress corrosion cracks and (c) welding bead cracks comprising causing two edges of one or more pieces of stainless steel to come together in welding relationship and welding the edges together by continuous inert gas arc welding with nonconsumable tungsten electrodes, said process characterized in that said stainless steel consists essentially of 0.01 to 0.1 percent by weight carbon, 2 to 6 percent by weight silicon, 0.01 to 3 percent by weight manganese, 7 to 20 percent by weight nickel, 13 to 25 percent by weight chromium, 0.5 to 5 percent copper and the remainder iron, the contents of the elements in the stainless steel satisfying the relationship $$\frac{Ni(\%)+0.5Mn(\%)+30C(\%)+2}{Cr(\%)+1.5Si(\%)-5.6}=1.06$$

10. A process according to claim 9 wherein said inert gas is argon.

11. Stainless steel having high resistance against stress corrosion cracks and against welding cracks, essentially consisting of, in percent by weight, 0.01 to 0.1 percent of carbon 2 to 6 percent of silicon (Si), 0.01 to 3 percent of manganese (Mn), 7 to 20 percent of nickel (Ni), 13 to 25 percent of chromium (Cr), 0.5 to 5 percent copper (Cu), and the remainder of iron with an inevitable amount of impurity, said contents of the elements in the stainless steel satisfying the relation of $$\frac{Ni(\%)+0.5Mn(\%)+30C(\%)+2}{Cr(\%)+1.5Si(\%)-5.6}=1.06$$

12. The stainless steel of claim 11 further comprising up to 0.1% molybdenum, the contents of the elements in said stainless steel satisfying the relationship $$\frac{Ni(\%)+0.5Mn(\%)+30C(\%)+2}{Cr(\%)+1.5Si(\%)+Mo(\%)-5.6}=1.06$$

13. The stainless steel of claim 11 further comprising 0.03 to 2.00% of at least one element selected from the group consisting of niobium (Nb), tantalum (Ta), and titanium (Ti), the contents of the elements in said stainless steel satisfying the relationship $$\frac{Ni(\%)+0.5Mn(\%)+30C(\%)+2}{Cr(\%)1.5Si(\%)+0.5Nb(\%)+0.5Ti(\%)+0.5Ta(\%)-5.6}=1.06$$

14. The stainless steel of claim 13 further comprising up to 0.1% molybdenum (Mo), the contents of the elements in said stainless steel satisfying the relationship $$\frac{Ni(\%)+0.5Mn(\%)+30C(\%)+2}{Cr(\%)+1.5Si(\%)+Mo(\%)+0.5Nb(\%)+0.5Ti(\%)+0.5Ta(\%)-5.6}=1.06$$

* * * * *